(12) United States Patent
Gorte et al.

(10) Patent No.: US 9,979,039 B2
(45) Date of Patent: May 22, 2018

(54) DIRECT CARBON FUEL CELL AND STACK DESIGNS (71) Applicant: The Trustees of The University of Pennsylvania, Philadelphia, PA (US)

(72) Inventors: Raymond J. Gorte, Narberth, PA (US); Tae-Sik Oh, Wynnewood, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 155 days.

(21) Appl. No.: 14/785,133

(22) PCT Filed: Mar. 17, 2014

(86) PCT No.: PCT/US2014/030287
§ 371 (c)(1),
(2) Date: Oct. 16, 2015

(87) PCT Pub. No.: WO2014/175976
PCT Pub. Date: Oct. 30, 2014

(65) Prior Publication Data
US 2016/0156056 A1    Jun. 2, 2016

Related U.S. Application Data (60) Provisional application No. 61/815,302, filed on Apr. 24, 2013.

(51) Int. Cl.
*H01M 8/12*    (2016.01)
*H01M 8/24*    (2016.01)
(Continued)

(52) U.S. Cl.
CPC ....... *H01M 8/1233* (2013.01); *H01M 4/8621* (2013.01); *H01M 8/0656* (2013.01);
(Continued)

(58) Field of Classification Search
CPC .... H01M 8/12; H01M 8/1213; H01M 8/1233; H01M 8/124; H01M 8/1246; H01M 8/0656; H01M 4/8621
See application file for complete search history.

(56) References Cited

U.S. PATENT DOCUMENTS 5,516,597 A * 5/1996 Singh .................. H01M 8/0215
429/468
6,379,828 B1    4/2002 Worth
(Continued)

FOREIGN PATENT DOCUMENTS

WO    WO 2013/019958 A1    2/2013

OTHER PUBLICATIONS

Javadekar, et al., "Characteristic of Molten Alloys as Anodes in Solid Oxide Fuel Cells", J. Electrochemical Soc., Oct. 2011, vol. 158(12) B1472-1478.
(Continued)

*Primary Examiner* — Kenneth J Douyette
(74) *Attorney, Agent, or Firm* — Baker & Hostetler LLP (57) ABSTRACT

Disclosed are novel configurations of Direct Carbon Fuel Cells (DCFCs), which optionally comprise a liquid anode. The liquid anode comprises a molten salt/metal, preferably Sb, and a fuel, which has significant elemental carbon content (coal, bio-mass, etc.). The supply of fuel is continuously replenished in the anode. In addition, a stack configuration is suggested where combining a large number of planar or tubular fuel elements.

30 Claims, 9 Drawing Sheets

(51) Int. Cl.
*H01M 8/02* (2016.01)
*H01M 4/86* (2006.01)
*H01M 8/1233* (2016.01)
*H01M 8/0656* (2016.01)
*H01M 8/1213* (2016.01)
*H01M 8/124* (2016.01)
*H01M 8/1246* (2016.01)

(52) U.S. Cl.
CPC ......... *H01M 8/124* (2013.01); *H01M 8/1213* (2013.01); *H01M 8/1246* (2013.01); *H01M 2008/1293* (2013.01); *Y02P 70/56* (2015.11)

(56) References Cited

U.S. PATENT DOCUMENTS

| | | | |
|---|---|---|---|
| 2002/0028367 A1* | 3/2002 | Sammes | G01N 27/419 429/489 |
| 2003/0143440 A1 | 7/2003 | Tao et al. | |
| 2006/0234098 A1 | 10/2006 | Gur | |
| 2007/0141447 A1* | 6/2007 | Crumm | H01M 8/0232 429/444 |
| 2009/0035620 A1 | 2/2009 | Finnerty et al. | |
| 2009/0117429 A1 | 5/2009 | Zillmer et al. | |
| 2011/0177421 A1* | 7/2011 | Wolk | H01M 4/8605 429/472 |

OTHER PUBLICATIONS

Javadekar, et al., "Energy Storage in Electrochemical Cells with Molten Sb Electrodes", J. Electrochemical Soc., Jan. 2012, 159(4), A386-A389.

Jayakumar, et al., "A Comparison of Molten Sn and Bi for Solid Oxide Fuel Cell Anodes", J. Electrochemical Soc., Jan. 2010, 157(3), B365-369.

Jayakumar, et al., "A Direct Carbon Fuel Cell with a Molten Antimony Anode", Energy & Environmental Science, Aug. 2011, 4, 4133-4137.

Steinberg, "Conversion of Fossil and Biomass Fuels to Electric Power and Transportation Fuels by the High Efficiency Integrated Plasma Fuel Cell (IPFC) Energy Cycle", Intern. Journal Hydrogen Energy, Oct. 2005, 31, 405-411.

* cited by examiner

FIG. 1

PRIOR ART

FIG. 2

PRIOR ART

DIRECT CARBON FUEL CELL AND STACK DESIGNS

CROSS REFERENCE TO RELATED APPLICATIONS

This application is a National Stage Application filed under 35 U.S.C. 371 of International Application No. PCT/US2014/030287, filed Mar. 17, 2014, which claims the benefit of U.S. patent application Ser. No. 61/815,302, filed Apr. 24, 2013, which is incorporated by reference in its entirety.

GOVERNMENT RIGHTS

This invention was made with government support under Grant No. DE-SC0001004 awarded by the U.S. Department of Energy. The government has certain rights in the invention.

TECHNICAL FIELD

This disclosure is in the field of energy generation and storage, including direct carbon fuel cells and stacks, and methods of operating the same.

BACKGROUND

Recently, researchers have been working to develop technology capable of efficiently producing energy from cheap and abundant solid carbonaceous fuel resources, like coal and renewable biomass. Much research has been devoted to developing direct carbon fuel cells (DCFCs) to electrochemically convert solid carbonaceous fuels to electricity.

The present inventions are directed to improvements in this technology field.

SUMMARY

Certain embodiments of the present invention provide direct carbon fuel cells, each of which comprises
(a) a chamber, comprising:
  (i) a first columnar structure oriented along a first substantially vertical axis;
  (ii) a second columnar structure comprising a wall, at least a portion of which comprises a solid non-porous oxide electrolyte capable of selectively transporting oxide ions through said wall, said second columnar structure oriented along a second substantially vertical axis;
(b) a vessel positioned above and in direct fluid communication with the first columnar structure, said vessel capable of containing a carbonaceous fuel; and
(c) a cathode adjacent to at least a portion of the solid non-porous oxide electrolyte of the second columnar structure,
said chamber being configured as a container such that the first and second columnar structures are in fluid communication with one another so as to allow fluid circulation therebetween.

Further embodiments include fuel cells further comprising an anode comprising a metal or metalloid that is molten and electrically conductive during the operation of the fuel cell. In some of these embodiments, these metals include molten metallic antimony or lead, preferably antimony. The invention further provides embodiments including various aspects of the vessel and the fuel(s) contained therein, and the anode. Specific descriptions are provided elsewhere herein for the structure, orientation, and materials associated with each of the columnar structures, the cathode, the current collectors, and contemplated operating temperatures.

Additional embodiments provide operating direct carbon fuel cells, each of which when operating comprises a circulating molten anode metal/metal oxide, said circulation driven by (a) cathode oxidation of a molten anode metal to a less dense molten metal oxide within the second columnar structure, (b) said less dense molten metal oxide then being carried by buoyant forces upward in the second columnar structure into the first columnar structure and into contact with a carbonaceous fuel contained within the vessel positioned above and in fluid communication with the first columnar structure, (c) whereupon the molten metal oxide oxidizes the carbonaceous fuel and itself is reduced to the denser molten anode metal, (d) at or after which time the denser anode metal sinks within the first columnar structure to provide a source for additional anode metal to be (e) drawn into the second columnar structure from a bottom portion of the second columnar structure to repeat the cycle.

Also provided are stack configuration embodiments, which configurations may comprise a plurality of direct carbon fuel cells, said fuel cells individually configured as provided elsewhere herein, wherein the vessels are capable of containing a carbonaceous fuel are in fluid communication with one another.

This disclosure also provides embodiments for operating the fuel cell or stacks, each method comprising a circulating molten anode/anode oxide, said method comprising (a) electrically reducing oxygen at the cathode to produce $O^{2-}$ anions; (b) said fuel cell configured to conduct the $O^{2-}$ anions through the solid non-porous oxide electrolyte to oxidize a molten anode metal to form a buoyant molten anode metal oxide and to convectively transport the buoyant molten anode metal oxide to the vessel containing a carbonaceous fuel, where the carbonaceous fuel is oxidized and the molten anode metal oxide is reduced; and (c) collecting the electrons generated with the oxidation of the carbonaceous fuel at a first current collector and directing them to the cathode.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 3 provides schematic representations of two illustrative embodiment of the present invention.

DETAILED DESCRIPTION OF ILLUSTRATIVE EMBODIMENTS

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to both fuel cells and methods of operating such fuel cells and associated systems. That is, where the disclosure describes and/or claims a feature or embodiment associated with a fuel cell, that feature or embodiment also refers to the method of operating such a fuel cell, and vice versa.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step or part may also be considered an independent embodiment in itself.

The present invention relates to designs and configurations of reactors for use as fuel cell. Solid oxide fuel cells (SOFC) are based on ceramic electrolytes that are oxygen-ion conductors. Because the electrolytes conduct oxygen ions, it is at least theoretically possible to carry out the electrochemical conversion of any combustible fuel, including liquid hydrocarbons or even solid fuels like coal. The generation of electrical power by direct utilization of various fuels in an SOFC would also provide significant benefits if it could be practiced on a large scale. The efficiency of an SOFC can be very high, with negligible $NO_x$ emissions. Moreover, if $CO_2$ sequestration is required, the exhaust gas from the anode is highly concentrated, allowing for easy $CO_2$ capture. Finally, direct utilization of hydrocarbon fuels greatly simplifies the overall conversion process by eliminating the need for gasification and steam reforming steps.

In any SOFC, $O_2$ from the air is reduced at the cathode to produce $O^{2-}$ anions, according to Equation 1.

$$O_2 + 4e^- \rightarrow 2O^{2-} \quad \quad 1)$$

The $O^{2-}$ ions then pass through the dense ceramic electrolyte, which must be an electronic insulator in order to generate current through movement of the $O^{2-}$ anions only. Finally, the $O^{2-}$ anions oxidize the fuel at the anode; if that fuel is carbon, the anode reaction is given by Equation 2).

$$C + 2O^{2-} \rightarrow CO_2 + 4e^- \quad \quad 2)$$

The overall fuel-cell reaction is $C + O_2 \rightarrow CO_2$ but the electrons produced at the anode have a higher potential energy from those consumed at the cathode.

Figure 1:
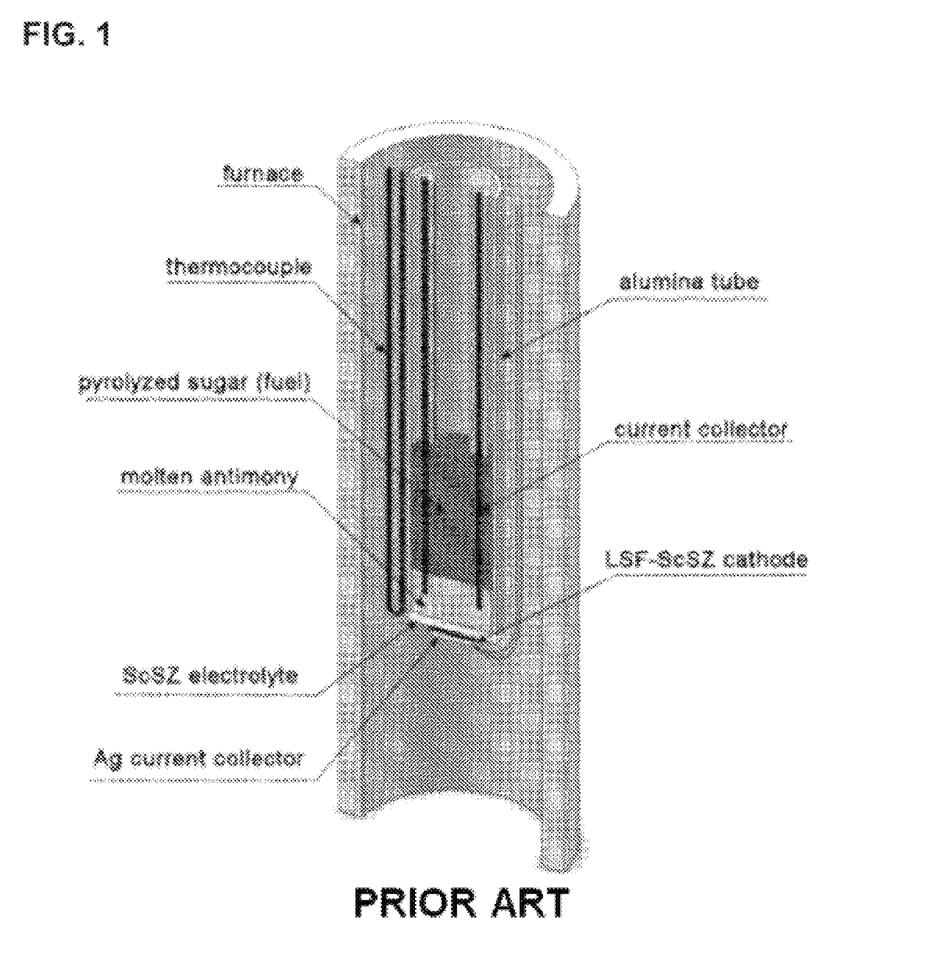
FIG. 1 illustrates a configuration of a direct carbon (or solid oxide) fuel cell system, where the cathode-electrolyte bilayer is attached at the bottom of an $Al_2O_3$ tube. The Sb anode rests above the electrolyte, under a bed of sugar char fuel. The cell was placed vertically in a tubular furnace. See Jayakumar, et al., *Energy & Environmental Science*, 2011, 4, 4133, incorporated by reference herein in its entirety for all purposes.
Figure 2:
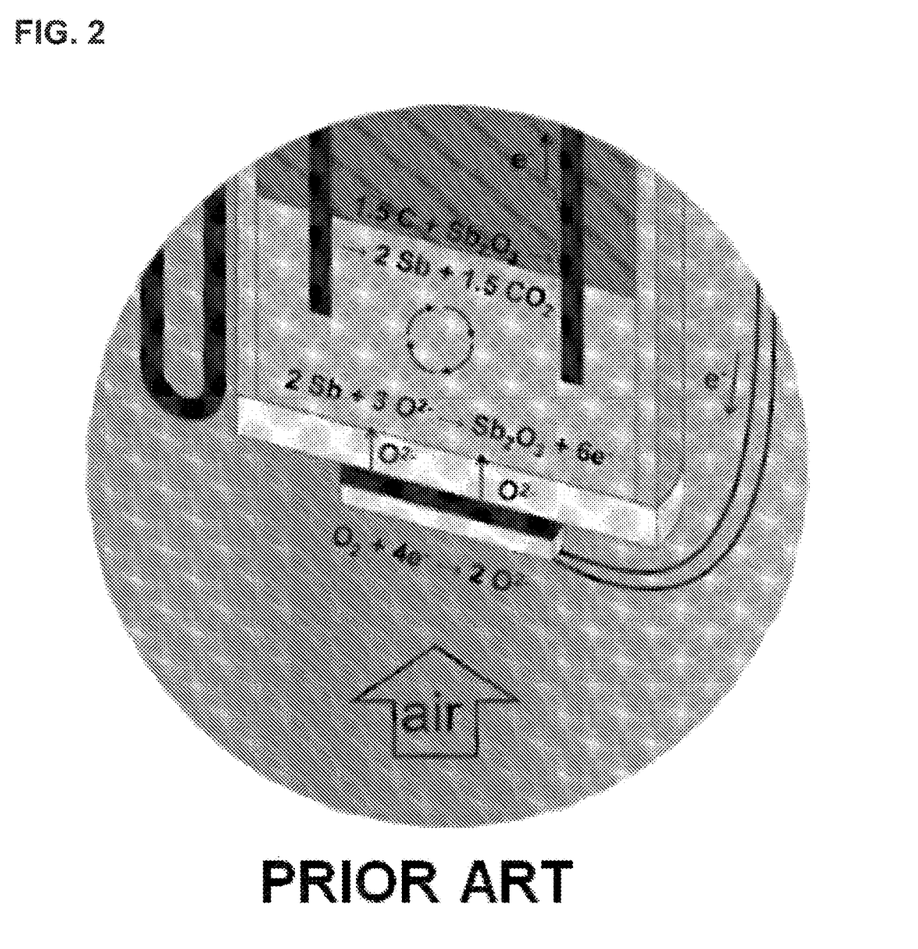
FIG. 2 provides an expanded view of FIG. 1 for a fuel cell with molten Sb anode and solid carbonaceous fuel. Oxygen from air reacts with electrons at the conductive LSF-ScSZ (lanthanum-strontium-iron oxide/scandium stabilized zirconia) cathode and the $O^{2-}$ ions are then transported through the ScSZ electrolyte. These ions oxidize the Sb anode at the electrolyte interface to form $Sb_2O_3$, which moves through the bulk of the anode to contact the surface of the solid fuel. Reduction of the $Sb_2O_3$ by the fuel regenerates the Sb anode.

One such configuration for such a reactor is shown in FIGS. 1 and 2, and illustrate the use with molten Sb anodes. In this illustrative example, the direct utilization of carbonaceous fuels, including biomass, using a solid oxide (or direct carbon) fuel cell (SOFC) with a molten antimony (Sb) anode at intermediate temperatures (e.g., 973 K) operates by the oxidation of the metallic Sb at the electrolyte interface with the resulting $Sb_2O_3$ being reduced by the fuel in a separate step. The reduction of $Sb_2O_3$ is shown to occur readily by contact with a range of different carbonaceous fuels at the fuel cell operating temperature.

The performance of SOFC operating on carbon is almost always limited by the transfer of oxide ions from the electrolyte to the solid fuel. Various approaches have been taken to facilitate this transfer. The present invention relates to reactors which use molten-metal electrodes. The Examples provide some information on the use of molten Sb in these presented inventive reactor configurations. While molten Sb is attractive for the reasons described herein, it should be appreciated that the invention is not limited to this metal, and the range of materials useful in the present configurations are describe elsewhere herein. See also Jayakumar, et al., *J. Electrochemical Soc.,* 157 (3), B365-369 (2010); Jayakumar, et al., *J. Electrochemical Soc.,* 158 (12) B1472-1478 (2011); and Jayakumar, et al., *J. Electrochemical Soc.,* 159 (4), A386-A389 (2012), each of which is incorporated by reference herein in its entirety for all purposes.

The present invention includes embodiments related to direct carbon fuel cells having very different and novel configurations relative to those previously described. In the following descriptions, reference is made to FIGS. 3-5 (the following reference numbers are described in FIG. 3).

In certain of these embodiments, each direct carbon fuel cell comprises:
  (a) a chamber 300 comprising:
    (i) a first columnar structure 301 oriented along a first substantially vertical axis;
    (ii) a second columnar structure 302 comprising a wall, at least a portion of which comprises a solid non-porous oxide electrolyte capable of selectively transporting oxide ions through said wall, said second columnar structure oriented along a second substantially vertical axis;
  (b) a vessel 303 positioned above and in direct fluid communication with the first columnar structure, said vessel capable of containing a carbonaceous fuel;
  (c) a cathode 304 adjacent to at least a portion of the solid non-porous oxide electrolyte of the second columnar structure;
  said chamber configured as a container such that the first and second columnar structures are in fluid communication with one another so as to allow fluid circulation therebetween.

In this latter aspect, a bottom portion of the second columnar structure is fluidicly coupled to a bottom portion of the first columnar structure and an upper portion of the second columnar structure is fluidicly coupled to an upper portion of the first columnar structure so as to form a fluidic circuit. See, e.g., FIGS. 3A, 4, and 5. The fluidic coupling at the upper portion of the first columnar structure 301 may be positioned either at a position below the vessel capable of containing a carbonaceous fuel (e.g., displaced by a distance 301A in FIG. 3A) or directly to the vessel.

Throughout this specification, words are to be afforded their normal meaning, as would be understood by those skilled the relevant art. However, so as to avoid misunderstanding, the meanings of certain terms will be specifically defined or clarified.

For example, in the descriptions herein, the term "columnar structure" is not intended to connote any particular aspect ratio; i.e., the ratio of length to width of the columnar structure can be less about 1, about 1, or greater than about 1. Rather, it is intended to connote the importance of substantially vertical orientation, so as to allow and/or promote a natural convective flow during operation of the fuel cell. As with respect to the cross-section of the first and second columnar structures, in certain embodiments, either or both have a cross-section that is round, oblong, oval, or polygonal (typically 4-, 5-, 6-, 8-, or 10-sided or higher) or a combination thereof In certain of these embodiments, the presence of a flat surface along the second columnar structure allows for the use of planar cathodes, as desired.

Figure 3A:
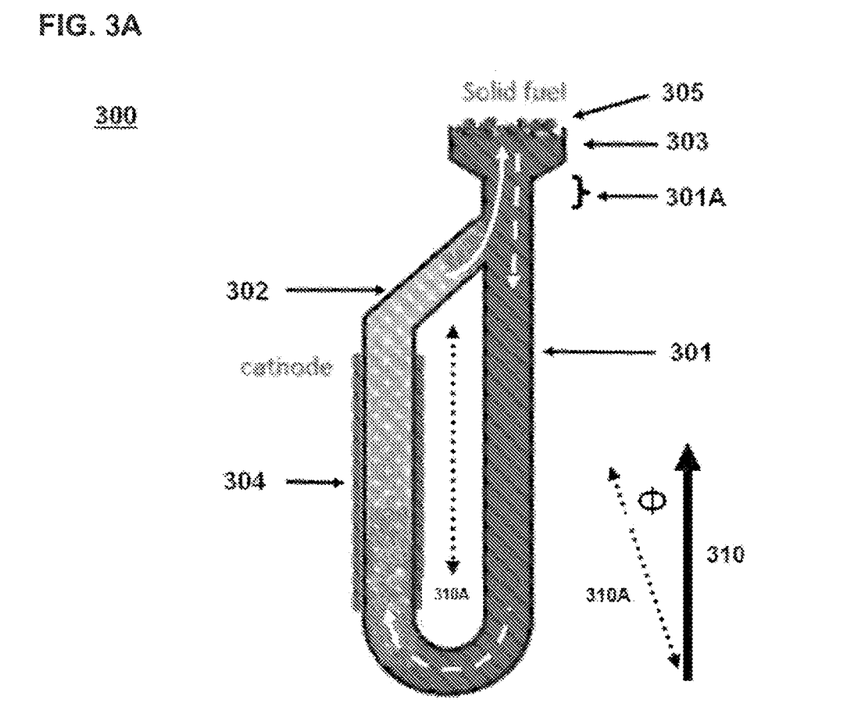
FIG. 3A illustrates one embodiment of a single cell, where the darker color in the right tubular structure is meant to represent metallic Sb, while the lighter colors in the left tubular structure is intended to show a higher presence of oxide.

Also as used herein, the term "substantially vertical" intended to connote that one end of the structure is physically lower than the other end; said structures may be substantially linear (as illustrated in FIG. 3A, element 301), bent (as illustrated in FIG. 3A, element 302) or curved or have one or more elements, each of which are linear or curved. Unless otherwise described, a structure is considered to be "substantially vertical" if a line constructed between the upper and lower ends is within 45° of a line of buoyancy as shown in 310. "Line of buoyancy" is the direction an air bubble would travel in water (or any less dense material in a more dense fluid, e.g., $Sb_2O_3$ in Sb), if otherwise unperturbed by external forces (e.g., stirring, electromotive fields, etc.) and reflects a true vertical line defined by gravity (e.g., 310). Referring to FIG. 3A, the dotted line 310A within reflects such a constructed line for fuel cell 300, element 310 reflects a line of buoyancy, and the angle, Φ, describes the angle therebetween. Other embodiments provide that this angle, Φ, is in a range of from about 0° (i.e., parallel with the line of buoyancy) to about 70°, to about 60°, to about 50°, to about 40°, to about 30°, to about 20°, or to about 10° of a line of buoyancy. In certain embodiments, at least one of the first and second substantially vertical axes are aligned parallel with a line of buoyancy 310 (e.g., Φ=0). In some embodiments, both axes are aligned parallel with a line of buoyancy 310. In other embodiments, at least one of the first and second substantially vertical axes are at different orientations with respect to the line of buoyancy.

The fuel cell, chamber, and container may each hold a solid, liquid, gas, or combination thereof, and be constructed of materials suitable for its intended use as a direct carbon fuel cell. The fuel cell should be capable of withstanding temperatures in a range of from about 600K to about 1150K, preferably 950K to about 1150K. Without being bound to any particular theory, such a criterion tends to favor ceramic oxides at least for the materials used in the columnar structures.

As described, the inventive cells each include at least one second columnar structure comprising a wall, at least a portion of which comprises a solid non-porous oxide electrolyte capable of selectively transporting oxide ions through said wall. While such electrolytes are known by those skilled in the art, in various embodiments, such solid oxide electrolytes comprises one or more oxides of Hf, Zr, Y, Sc, Yb, La, Ga, Gd, Bi, Ce, and Th, optionally doped with oxides from the group consisting of alkaline earth metals and rare earth metals. In some embodiments, the solid oxide electrolyte comprises zirconia, for example doped with Y or Sc. (e.g., YSZ or ScSZ). Depending on the nature of the molten anode metal and/or metal oxide, it may be desirable in some embodiments to coat at least one surface (e.g., the surface contacting the molten anode) with an oxide barrier layer (e.g., Ca- or Mg-doped zirconia or doped ceria) to improve chemical corrosion resistance or embrittlement.

The fuel cells of the present invention also comprise a cathode 304 which itself typically comprises a ceramic metal oxide. Again, such materials are commonly used as SOFC cathodes and known by those skilled in the art. In certain embodiments, these comprise a lanthanum-strontium-manganese oxide (LSM) or a lanthanum-strontium-iron oxide (LSF), e.g., $La_{0.8} Sr_{0.2}FeO_3$ or $La_{0.8} Sr_{0.2}MnO_3$, or other oxides.

The positioning of the cathode is typically directly adjacent to the solid non-porous electrolyte of the second columnar structure, for example as configured and positioned as shown within the figures.

In certain embodiments, the fuel cell further comprises an anode comprising a metal (or metalloid) which is molten and electrically conductive while within the temperature ranges described herein, including during the operation of the fuel cell. While the anode may comprise a metal or metalloid, for the sake of brevity, the term "metal" or "metallic" is used to reflect a material that meets these conditions. The chamber / container suitably sustainably contains the liquid / molten anode during the operation of the cell (the terms "liquid" and "molten" are practically interchangeable in the present context). In certain of these embodiments, the metal (or metalloid) forms a thermodynamically stable oxide which is also liquid/molten and less dense than the molten anode metal at a temperature in a range of from about 500K to about 1200K. Other embodiments provide that the anode metal and metal oxide are both liquid over a temperature range bounded at the lower end by a value of about 500, 550, 600, 650, 700, 750, or 800K and at the upper end by a value of about 1200, 1150, 1100, 1050, 1000, 950, or 900K. The anode may comprise metallic antimony or lead (including their respective oxides), and is preferably antimony. While antimony/antimony oxide ($Sb_2O_3$) is a preferred anode material pair, the anodes may also include alloys, both of Sb and Pb and potentially with Ag and Bi, and/or with metals that reduce more easily than Sb.

Antimony, Sb, is attractive, in part, because both Sb (melting point 903 K) and $Sb_2O_3$ (melting point 929 K) have melting points below the temperatures typically used for operation of the fuel cells, 973 to 1073 K, which precludes the formation of a solid oxide film at the electrolyte-anode interface (as happens in corresponding Sn systems). The impedance of molten Sb electrodes is also very low, less than 0.1 $\Omega cm^2$ at 973 K, and is reasonably independent of the $Sb/Sb_2O_3$ ratio. The Nernst Potential for Sb oxidation is lower compared to that for carbon oxidation, 0.75 V versus~1 V at 973 K. Although this lower OCV does represent a loss of available energy for producing electricity, the lost electrical energy would still be available as high-quality heat. The high thermal conductivity of the molten metal makes it possible to operate the cell isothermally and to collect the high-quality heat efficiently. Furthermore, the anode impedance associated with Sb oxidation is so low that it is still possible to operate cells at reasonable potentials. Finally, the difference in oxidation potentials between carbon and Sb makes the reduction of $Sb_2O_3$ by the solid carbonaceous fuels thermodynamically spontaneous.

Embodiments of the fuel cells are described as including a vessel 303 positioned above and in direct fluid communication with the first columnar structure, said vessel capable of containing a carbonaceous fuel. In certain embodiments, the vessel contains a carbonaceous fuel and is configured to place the carbonaceous fuel into physical contact with the anode during operation of the fuel cell. As contemplated herein, the carbonaceous fuel may be derived from biomass or waste fuels. Non-limiting examples of such carbonaceous fuels include materials derived from pulverized coal, charcoal, peat, coke, char, petroleum coke, oil sand, tar sand, waste plastics, biomass, and carbon produced by pyrolysis of a carbonaceous substance. In some embodiments, the carbonaceous fuel comprises sugar char, rice starch, carbon black, or a combination thereof, each of which is preferably at least partially dehydrated before being placed in contact with the molten anode. It is also preferred, but not necessarily required, that the carbonaceous fuel can be oxidized at temperatures below about 1000K.

In certain embodiments, the fuel cell further comprises a device (e.g., at least one fan blade, paddle, or skimmer) for mixing the interface between the fuel and molten anode oxide, so as to at least partially break up or remove any "ash" layer that can form at the carbon-Sb interface with some of the fuels during the operation of the cell.

In some embodiments, the fuel cell further comprising (a) a first current collector positioned within the first columnar structure, capable of being in electrical communication with a molten anode during the operation of the fuel cell; (b) a second current collector in electrical communication with the cathode; or (c) both (a) and (b). Where present, the first and second current conductors should be corrosion resistant within their respective environments. Exemplary current conductors are those materials comprising Au, Ag, Re, Mo, Pd, Pt, W, graphite, or a combination thereof. The first current conductor, in contact with the molten anode, is suitably capable of withstanding chemical degradation on contact with anode or anode oxide. In the case of $Sb/Sb_2O_3$, Re is one such material. The choice of the material for the second current collector, when remote from the anode material includes a variety of materials, including silver.

Figure 3B:
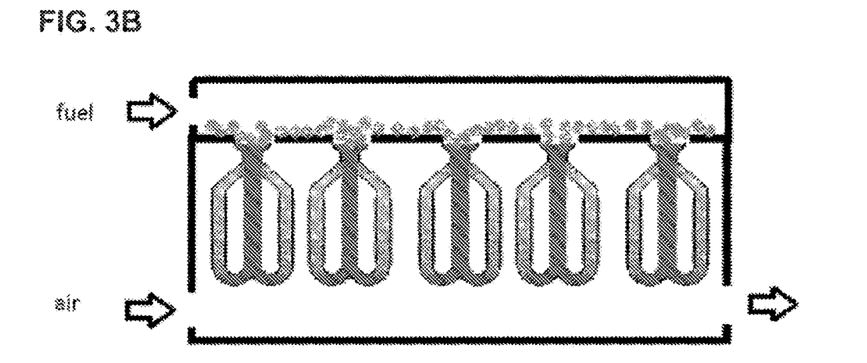
FIG. 3B illustrates one possible stack configuration.
Figure 4:
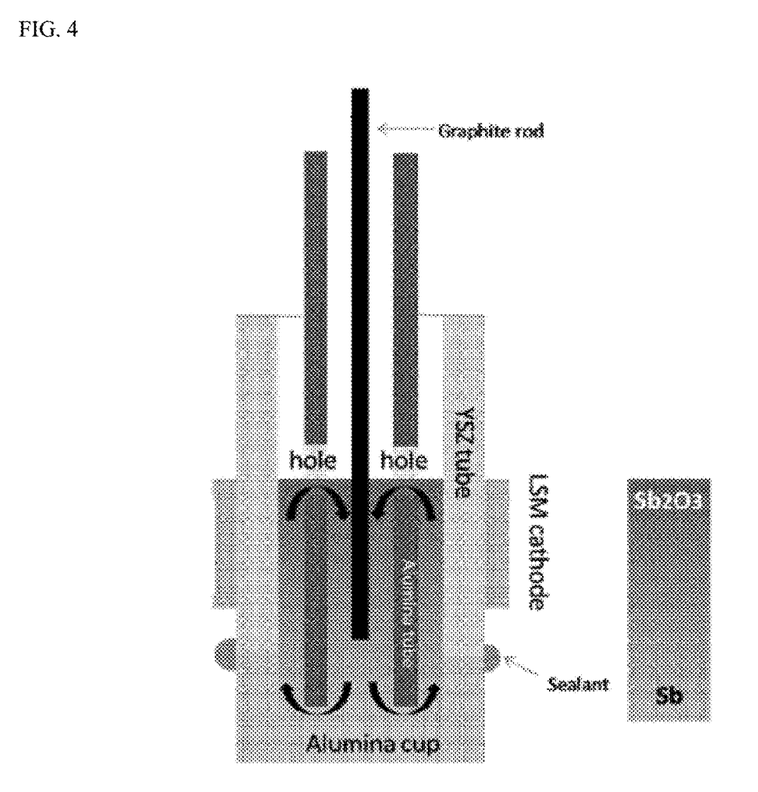
FIG. 4 illustrates another cut-away schematic of an embodiment of the present invention, in which an alumina columnar structure and the liquid anode is contained within a YSZ columnar structure/alumina container, and the cathode is positioned adjacent to the YSZ tube.
Figure 5:
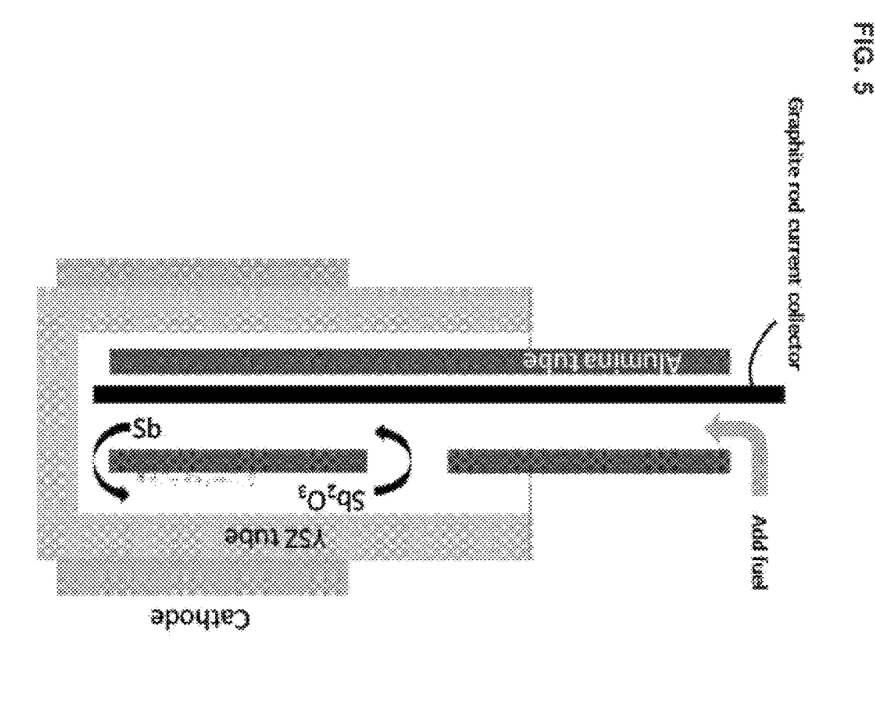
FIG. 5 illustrates yet another cut-away schematic of an embodiment of the present invention, in which an alumina columnar structure is contained within a YSZ columnar structure, and the cathode is positioned adjacent to the YSZ structure.

To this point, the embodiments have been described in terms of individual first and second columnar structures, where the first columnar structure may be located external to the second columnar structure (e.g., FIG. 3A), but as shown in FIGS. 3B, 4, and 5, the invention is not so limited. As exemplified in FIG. 3B, in certain embodiments each cell may comprise multiple first or second columnar structures, each located external to the others. For example, the cells may be arranged so that each chamber comprises a plurality of second columnar structures, each having a wall at least a portion of which comprises a solid non-porous oxide electrolyte (and cathode), each second columnar structure oriented along a corresponding substantially vertical axis, and each in fluid communication with the first columnar structure. Further, as shown in FIG. 3B, stacks of cells may be constructed from multiple individual cells, for example, by configuring the cathode from the first cell in contact with the anode from the next, so as to achieve a stack with a higher output voltage. Stacks may also be configured by having the carbonaceous carbon vessels of each cell in physical contact/ fluid communication with one another, for example in serial arrangement. That is, additional embodiments provide for stack configurations of these inventive cells, each stack configuration comprising a plurality of direct carbon fuel cells, said fuel cells individually configured as described herein, wherein the vessels capable of containing a carbonaceous fuel are in fluid communication with one another.

In other embodiments, a first columnar structure is located within and/or contained by the second columnar structure. Such embodiments are exemplified in the schematic structures shown in FIGS. 4 and 5. In other embodiments, multiple first columnar structures, each comprising a solid oxide electrolyte and each oriented along a corresponding substantially vertical axis are in fluid communication and positioned within a second columnar structure.

EXAMPLES

Overview: The following experiments illustrate the long term stability of solid oxide fuel cells (SOFC) that utilize solid carbonaceous fuels with molten Sb and Sb—Bi alloy anodes at 973 K. The operation of these direct carbon fuel cells (DCFC) involved the oxidation of metallic Sb at the electrolyte-anode interface to produce molten $Sb_2O_3$, which was then reduced by the fuel in a separate step. The cell performance duration, however, with traditional solid fuels is severely limited by the formation of an ash layer on the surface of the partially oxidized solid fuel particles, which prevents further fuel utilization. This issue is resolved by stirring the anode-fuel interface to shear away the ash layer. Such DCFCs can generate energy at high power densities for >200 hours with periodic stirring. The three different solid fuels used were a pyrolyzed bio-oil, pyrolyzed rice starch, and activated charcoal. During these tests, the ohmic resistance decreased with time below that expected for the $Sc_2O_3$-stabilized $ZrO_2$ electrolyte's thickness. Inspection by scanning electron microscopy revealed the graining and subsequent depletion of the electrolyte at its interface with the anode. $Y_2O_3$-stabilized $ZrO_2$ on the other hand, showed no thinning but underwent restructuring shown by grain formation.

Example 1

Experimental

Because the anodes in the fuel cells used here consisted simply of having the molten metal in contact with the bare electrolyte surface, the ceramic component of the cells consisted of just the electrolyte with cathode on one side. The cathode-electrolyte wafers were constructed using tape-casting methods that have been described in other papers. Briefly, tapes, with and without pore formers, were laminated and fired to produce a bilayer wafer of the electrolyte material with one side porous and the other dense. The circular porous layer was 0.67 cm in diameter while the dense electrolyte layer was 1.4 cm in diameter. The electronically conductive cathode was prepared from the porous layer by infiltration of nitrate salts to produce a composite that was 35-wt % LSF ($La_{0.8}Sr_{0.2}FeO_3$). X-ray diffraction was used to confirm that the LSF had the proper perovskite structure following calcination to 1123 K.

Figure 6:
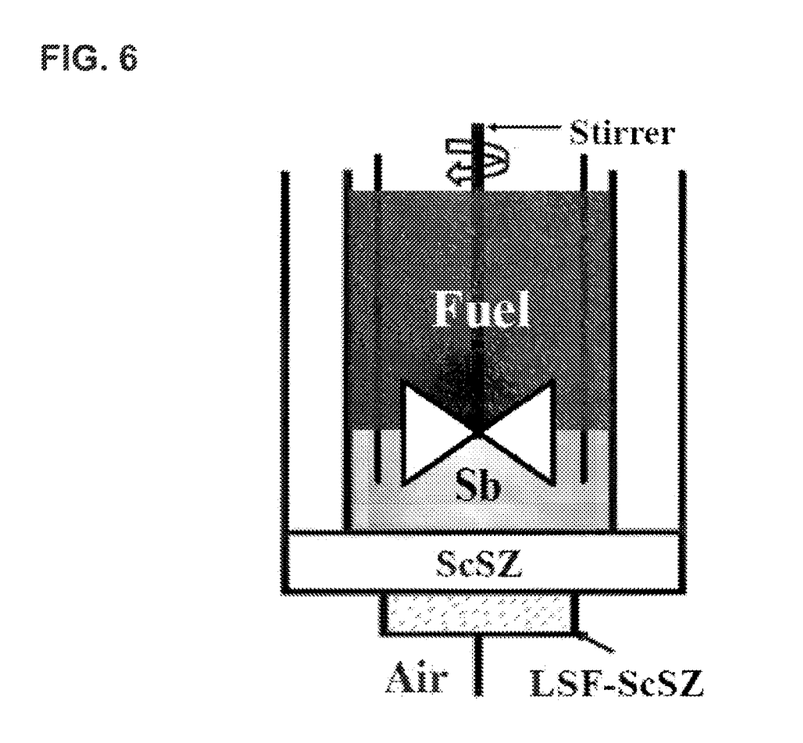
FIG. 6 provides a schematic representation of the experimental apparatus used in the Examples. See Example 1.

The two electrolyte materials tested in this study were 10% $Sc_2O_3$-stabilized $ZrO_2$ (ScSZ) and 8% $Y_2O_3$-stabilized $ZrO_2$ (YSZ). Although ScSZ was significantly more expensive than YSZ, it was mechanically stronger and had a higher ionic conductivity. The cells made with ScSZ had 100-μm thick electrolytes, while the YSZ cells had electrolytes that were 160 μm thick, made by laminating two 80-μm tapes. In both ScSZ and YSZ cells, the porous cathode was 50 μm thick. The experimental apparatus is shown schematically in FIG. 6 and was similar to that used in an earlier study of electrochemical energy storage, where mixing of the molten $Sb/Sb_2O_3$ mixture was critical. The fuel cell was attached to the end of an alumina tube with a ceramic adhesive (Aremco Ceramabond 552). Silver paste and wires were used to make electrical connections to the cathode.

Next, metal powder was added into the alumina tube, making contact with the electrolyte surface by gravity. Experiments with pure Sb used 10 g of Sb powder (−100 mesh, 99.5%, Alfa Aesar), while experiments with the Sb—Bi alloy employed a mixture 8 g of Sb and 3.45 g of Bi (−100 mesh, 99%, Sigma-Aldrich) to produce an alloy that was 20-mol % Bi. Rhenium wires were inserted into the anode for current collection. After inserting an alumina stirring rod to the anode-fuel interface, the top end of the alumina tube was plugged with glass wool. Finally, the fuel cell was placed in a tube furnace and heated to 973 K. The powdered fuels added directly onto the anode. To assist in the addition of the biomass fuels, these were always added as a 40:60 mixture with charcoal (Supelco). Following an initial charge of 1.5 g of fuel, 0.5-g fuel additions were made every 6 to 10 hours of cell operation. Stirring of the anode-fuel interface was carried out for 2 to 5 min before and after every fuel addition. To obtain a better measure of the amount of fuel that was added to the anode compartment, each of the fuels was briefly heated to 873 K in an inert gas in order to drive off volatile gases, prior to measuring the fuel weight added to the cell. In a typical 200-h experiment, the total amount of fuel added to the anode was approximately 13 g, of which approximately 5 g was recovered at the end of the experiment. As a point of reference, 4.0 g of pure C would be required to produce a current of 500 $mA/cm^2$ for 200 h, with the current density referenced to the active area of our cathodes, 0.353 $cm^2$. The difference between the amounts of fuel that were consumed and the electron balance are partially associated with oxygen in the fuel and partially to remaining volatility in the fuel. The biomass fuels were rice starch (Sigma-Aldrich) and Bio-Oil. The Bio-Oil was provided by Renewable Oil International LLC (ROI) and was produced by fast pyrolysis of hardwood trees. The electrochemical and impedance measurements in this study were performed using a Gamry Instruments Potentiostat. Unless otherwise stated, the current densities reported in this paper were normalized to the external area of the cathodes. The impedance spectra were performed galvanostatically in the frequency range from 300 kHz to 0.1 Hz with an A.C. perturbation of 1 mA. Scanning electron microscopy (SEM) was performed using a JEOL 7500F HRSEM.

Example 2

Results

Example 2.1

Cells with ScSZ Electrolytes

Figure 7:
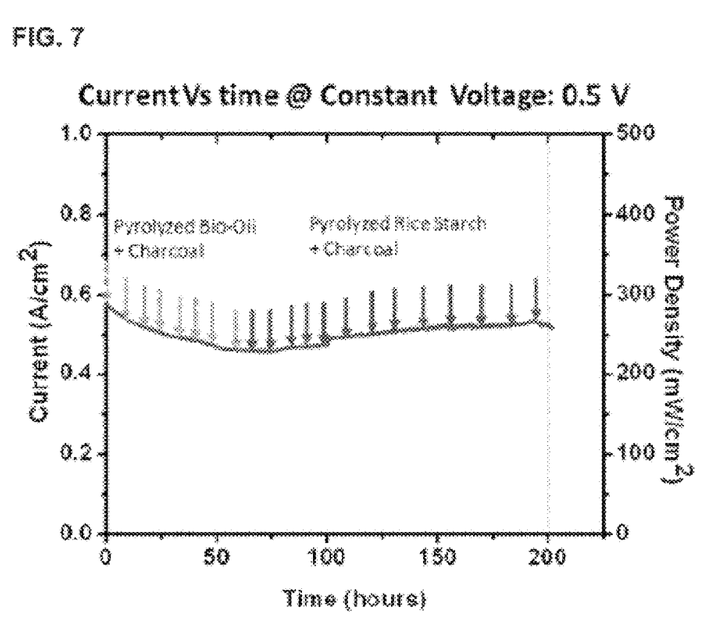
FIG. 7 shows the long term performance plot for the DCFC with a pure Sb anode and an ScSZ electrolyte. The DCFC was run on 3 different solid fuels, pyrolyzed bio-oil, pyrolyzed rice starch, and activated charcoal. Current was generated at a constant voltage of 0.5 V. See Example 2.1.
Figure 8:
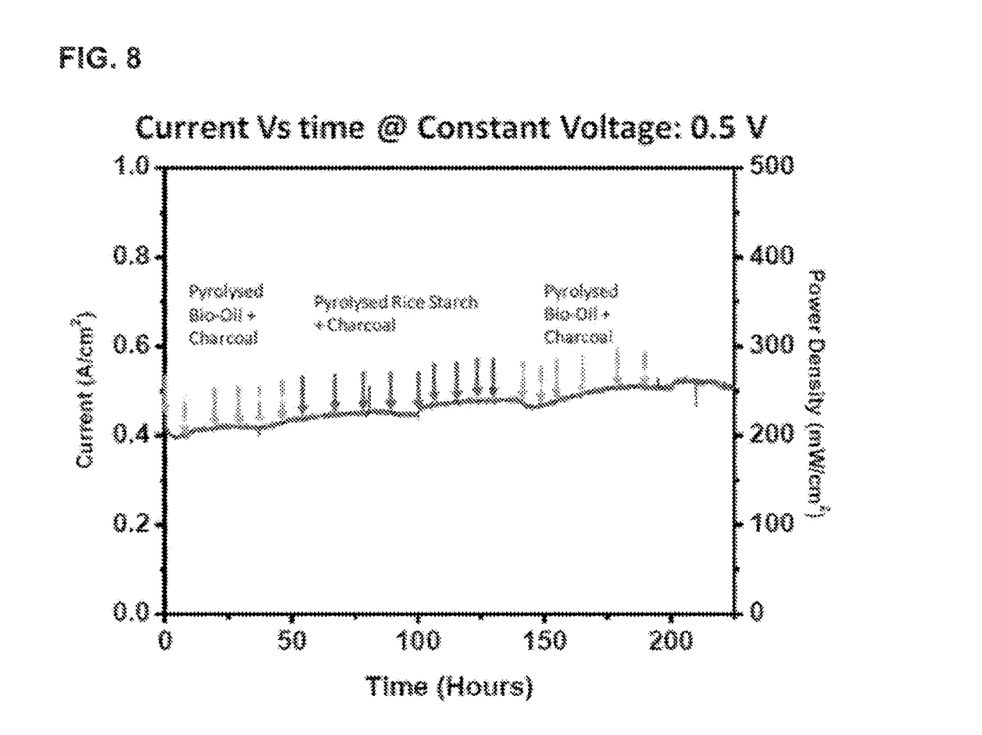
FIG. 8 shows the long term performance plot for the DCFC with an Sb—Bi alloy anode and an ScSZ electrolyte. The DCFC was run on 3 different solid fuels, pyrolyzed bio-oil, pyrolyzed rice starch, and activated charcoal. Current was generated at a constant voltage of 0.5 V. See Example 2.1.

FIGS. 7 and 8 show results from a 200-h experiment in which the current density, based on the external area of the cathode, was monitored while holding the cell potential at 0.5 V, with intermittent addition of various fuels. The arrows indicate the times at which 0.5 g increments of fuel (60-wt % charcoal, 40-wt % either rice starch or bio-oil) were added. The calculated power densities are reported on the right side. The cell in this study had a 100-μm ScSZ electrolyte, with an LSF-ScSZ composite cathode and 10 g of Sb as the anode. The current density initially drifted downward during the first 70 h, from a current density of 580 $mA/cm^2$ and power density of 290 $mA/cm^2$, to a current density of 460 $mA/cm^2$, after which the performance started to improve.

Figure 9:
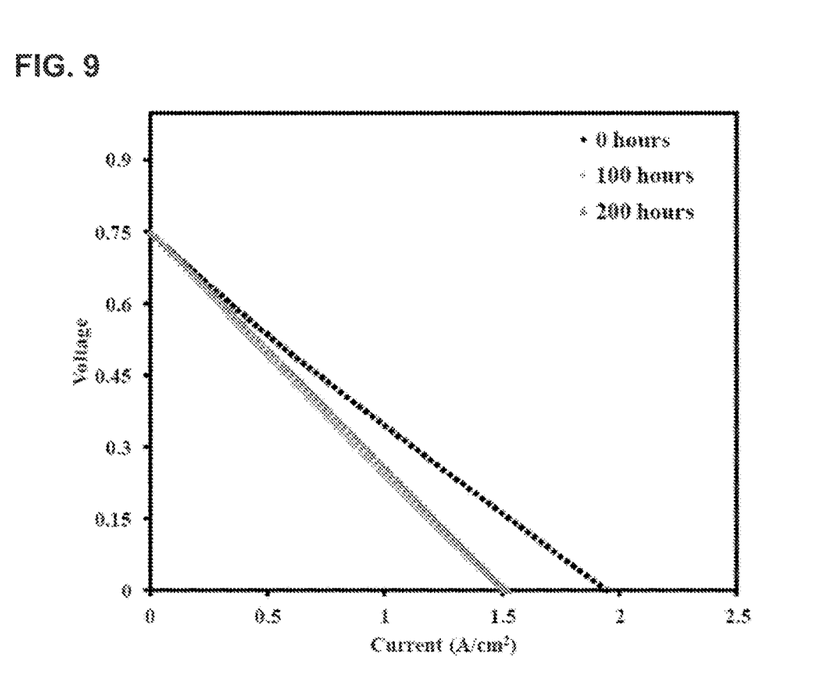
FIG. 9 shows V-I polarization curves for the DCFC with a pure Sb anode and an ScSZ electrolyte. See Example 2.1.

V-i polarization curves and impedance plots for the cell at 0 h, 100 h, and 200 h are shown in FIG. 9. The open-circuit voltage (OCV) was 0.75 V at all times, in agreement with the expected Nernst potential for Sb oxidation to $Sb_2O_3$. However, the slope of the V-i relationship, also known as the specific cell resistance, did increase from an average initial value of 0.38 $\Omega cm^2$ to 0.50 $\Omega cm^2$ after 100 h. The V-I relationships at 100 and 200 h were virtually unchanged.

It should be appreciated that independent embodiments of the fuel cells of the present inventions include those configurations with or without the molten anode material, and either operating or not. One of the advantages of the present configurations is their ability to take advantage of buoyancy to drive the operation of the cell. Accordingly, various embodiments of the invention include operating direct carbon fuel cells, each configured as described in any of the relevant embodiments described herein, which when operating comprises a circulating molten anode metal/metal oxide, said circulation driven by (a) cathode oxidation of a molten anode metal to a less dense molten metal oxide within the second columnar structure, (b) said less dense molten metal oxide then being carried by buoyant forces upward in the second columnar structure into the first columnar structure and into contact with a carbonaceous fuel contained within the vessel positioned above and in fluid communication with the first columnar structure (see, e.g., the curved line in FIG. 3A), (c) whereupon the molten metal oxide oxidizes the carbonaceous fuel and itself is reduced to the denser molten anode metal, (d) at or after which time the denser anode metal sinks within the first columnar structure to provide a source for additional anode metal (see, e.g., the dashed line in FIG. 3A) to be (e) drawn into the second columnar structure from a bottom portion of the second columnar structure to repeat the cycle. These fuel cells, when operating, generates electrical current by the oxidation of the carbonaceous fuel by the molten anode metal oxide.

The present invention contemplates and includes methods of operating the disclosed direct carbon fuel cells. In certain of these embodiments, these methods comprise operating direct carbon fuel cell or cell stack configured as in any one of disclosed embodiments, which when operating comprises a circulating molten anode/anode oxide, said method comprising (a) electrically reducing oxygen (comprising air or oxygen enriched air) at the cathode to produce $O^{2-}$ anions; (b) said fuel cell configured to conduct the $O^{2-}$ anions through the solid non-porous oxide electrolyte to oxidize a molten anode metal to form a buoyant molten anode metal oxide and to convectively transport the buoyant molten anode metal oxide to the vessel containing a carbonaceous fuel, where the carbonaceous fuel is oxidized and the molten anode metal oxide is reduced; and (c) collecting the electrons generated with the oxidation of the carbonaceous fuel at a first current collector and directing them to the cathode.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention. The disclosures of each patent, patent application, and publication cited or described in this document are hereby incorporated herein by reference, each in its entirety, for all purposes.

What is claimed is:

1. A direct carbon fuel cell, comprising:
   (a) a circuit comprising:
      (i) a first columnar structure oriented along a first substantially vertical axis;
      (ii) a second columnar structure comprising a wall, at least a portion of which comprises a solid non-porous oxide electrolyte capable of selectively transporting oxide ions through said wall, said second columnar structure oriented along a second substantially vertical axis;
   (b) a vessel positioned above and in direct fluid communication with the first columnar structure, said vessel capable of containing a carbonaceous fuel;
   (c) a cathode adjacent to at least a portion of the solid non-porous oxide electrolyte of the second columnar structure; and
   (d) an anode comprising a metal or metalloid that is molten and electrically conductive during the operation of the fuel cell and that forms a thermodynamically stable anode oxide which is molten and less dense than the molten anode metal or metalloid,
   said circuit being configured such that the first and second columnar structures are in fluid communication with one another so as to allow fluid circulation therebetween and
   said fuel cell being configured so as to effect cathode oxidation of the molten anode metal or metalloid to the less dense molten anode oxide within the second columnar structure,
   said less dense molten anode oxide then being carried by buoyant forces upward in the second columnar structure into the first columnar structure and into contact with a carbonaceous fuel contained within the vessel positioned above and in fluid communication with the first columnar structure such that the molten metal oxide oxidizes the carbonaceous fuel and is itself reduced to the denser molten anode metal or metalloid, at or after which time the denser anode metal or metalloid sinks within the first columnar structure so as to provide a source for additional anode metal to be drawn into the second columnar structure from a bottom portion of the second columnar structure.

2. The fuel cell of claim 1, wherein the metal or metalloid forms a thermodynamically stable anode oxide which is molten and less dense than the molten anode metal or metalloid at a temperature in a range of from about 500 K to about 1200 K.

3. The fuel cell of claim 1, wherein the anode comprises metallic antimony or lead.

4. The fuel cell of claim 1, wherein the vessel contains a carbonaceous fuel and is configured to place the carbonaceous fuel into contact with the anode during operation of the fuel cell.

5. The fuel cell of claim 1, further comprising (a) a first current collector positioned within the first columnar structure, capable of being in electrical communication with a molten anode during the operation of the fuel cell; (b) a second current collector in electrical communication with the cathode; or (c) both (a) and (b).

6. The fuel cell of claim 1, wherein a bottom portion of the second columnar structure is fluidicly coupled to a bottom portion of the first columnar structure and an upper portion of the second columnar structure is fluidicly coupled to an upper portion of the first columnar structure so as to form a fluidic circuit.

7. The fuel cell of claim 1, wherein at least one of the first and second substantially vertical axes are aligned parallel with a line of buoyancy.

8. The fuel cell of claim 1, wherein at least one of the first and second substantially vertical axes are at different orientations with respect to the line of buoyancy.

9. The fuel cell of claim 1, wherein at least one of the first and second columnar structures have a round, oblong, oval, or polygonal cross-section.

10. The fuel cell of claim 1, wherein the first columnar structure is located external to the second columnar structure.

11. The fuel cell of claim 10, wherein the fuel cell comprises a plurality of second columnar structures, each having a wall at least a portion of which comprises a solid non-porous oxide electrolyte, each second columnar structure oriented along a corresponding substantially vertical axis, and each in fluid communication with the first columnar structure.

12. The fuel cell of claim 1, wherein the first columnar structure is located within the second columnar structure.

13. The fuel cell of claim 12, wherein the fuel cell comprises a plurality of first columnar structures, each comprising a solid oxide electrolyte, each oriented along a corresponding substantially vertical axis, and each in fluid communication with the second columnar structure.

14. The fuel cell of claim 2, which when operating generates electrical current by the oxidation of the carbonaceous fuel by the molten oxide.

15. The fuel cell of claim 1, wherein the solid oxide electrolyte comprises one or more oxides of Hf, Zr, Y, Sc, Yb, La, Ga, Gd, Bi, Ce, and Th, optionally doped with oxides from the group consisting of alkaline earth metals and rare earth metals.

16. The fuel cell of claim 1, wherein the solid oxide electrolyte comprises zirconia.

17. The fuel cell of claim 1, wherein at least one surface of the second columnar structure is coated with an oxide barrier layer.

18. The fuel cell of claim 1, said cell capable of withstanding temperatures in a range of from about 600K to about 1150K.

19. The fuel cell of claim 1, wherein the cathode comprises a ceramic metal oxide.

20. The fuel cell of claim 19, wherein the cathode comprises a lanthanum-strontium-manganese oxide or a lanthanum-strontium-iron oxide.

21. The fuel cell of claim 2, wherein the anode and anode oxide are both liquid at a temperature in a range of from about 950K to about 1150K.

22. The fuel cell of claim 5, wherein the first and second current conductors are corrosion resistant within their respective environments.

23. The fuel cell of claim 5, wherein the first or second or both first and second current conductors comprise Au, Ag, Re, Mo, Pd, Pt, W, graphite, or a combination thereof.

24. The fuel cell of claim 1, wherein the carbonaceous fuel can be oxidized at temperatures below about 1000K.

25. The fuel cell of claim 1, wherein the carbonaceous fuel is derived from biomass or waste fuels.

26. The fuel cell of claim 1, wherein the carbonaceous fuel comprises sugar char, rice starch, carbon black, or a combination thereof.

27. An operating direct carbon fuel cell configured as a fuel cell of claim 1, which when operating comprises a circulating molten anode metal / metal oxide, said circulation driven by:
  (a) cathode oxidation of a molten anode metal to a less dense molten metal oxide within the second columnar structure,
  (b) said less dense molten metal oxide then being carried by buoyant forces upward in the second columnar structure into the first columnar structure and into contact with a carbonaceous fuel contained within the vessel positioned above and in fluid communication with the first columnar structure,
  (c) whereupon the molten metal oxide oxidizes the carbonaceous fuel and itself is reduced to the denser molten anode metal,
  (d) at or after which time the denser anode metal sinks within the first columnar structure to provide a source for additional anode metal to be
  (e) drawn into the second columnar structure from a bottom portion of the second columnar structure to repeat the cycle.

28. A stack configuration comprising a plurality of direct carbon fuel cells, said fuel cells individually configured as in claim 1, wherein the vessels capable of containing a carbonaceous fuel are in fluid communication with one another.

29. A method of operating direct carbon fuel cell or cell stack configured as in claim 1, which when operating comprises a circulating molten anode/anode oxide, said method comprising:
  (a) electrically reducing oxygen at the cathode to produce $O^{2-}$ anions;
  (b) said fuel cell configured to conduct the $O^{2-}$ anions through the solid non-porous oxide electrolyte to oxidize a molten anode metal to form a buoyant molten anode metal oxide and to convectively transport the buoyant molten anode metal oxide to the vessel containing a carbonaceous fuel, where the carbonaceous fuel is oxidized and the molten anode metal oxide is reduced; and
  (c) collecting the electrons generated with the oxidation of the carbonaceous fuel at a first current collector and directing them to the cathode.

30. The fuel cell of claim 1, wherein the fuel cell is configured to keep the carbonaceous fuel from circulation in the first columnar structure.

* * * * *